Jan. 5, 1937.   E. W. SMITH ET AL   2,066,701
PROCESS FOR SETTING NEWLY PASTED STORAGE BATTERY PLATES
Filed Nov. 3, 1932   8 Sheets-Sheet 5
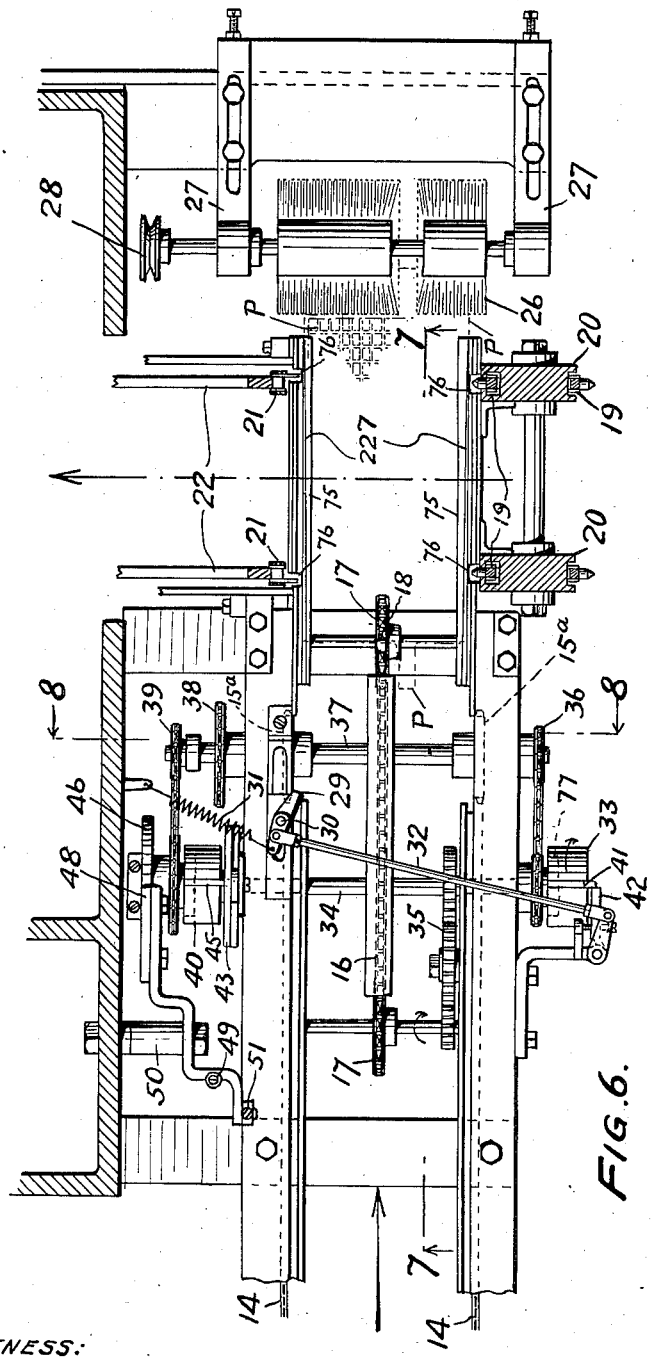
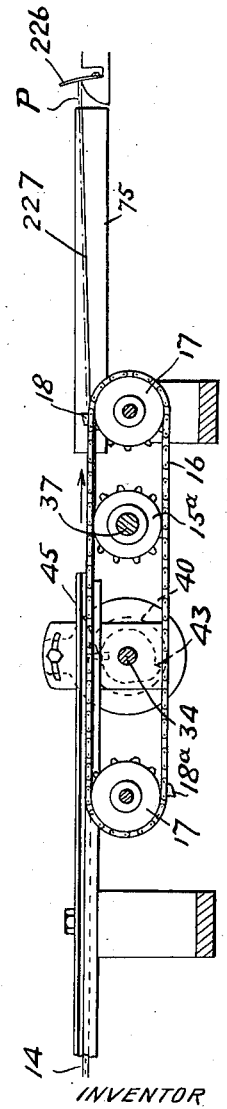
INVENTOR
Edward W. Smith
Clarence A. Hall
BY Augustus B. Stoughton
ATTORNEY.
WITNESS:
Robt. R. Kitchel

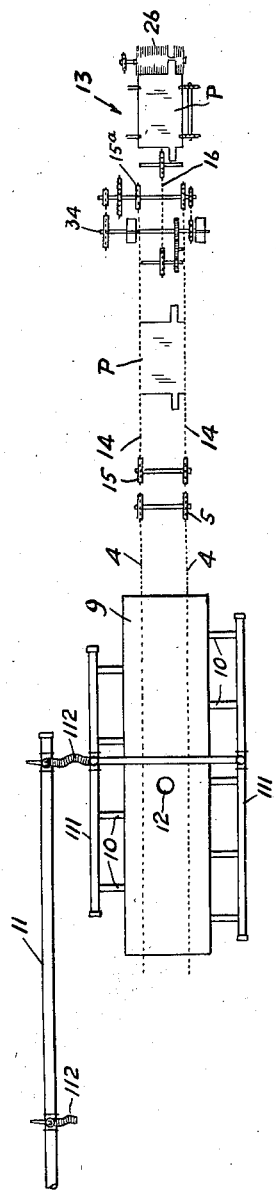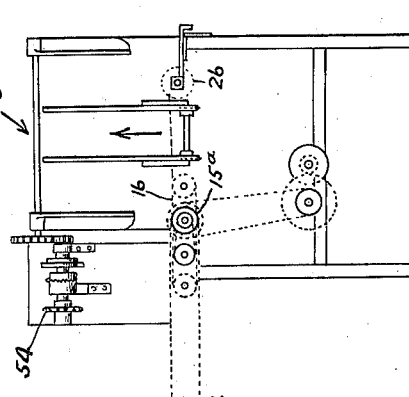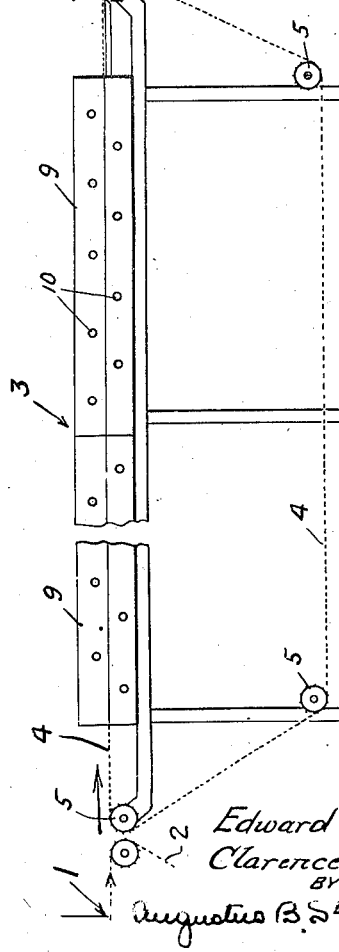

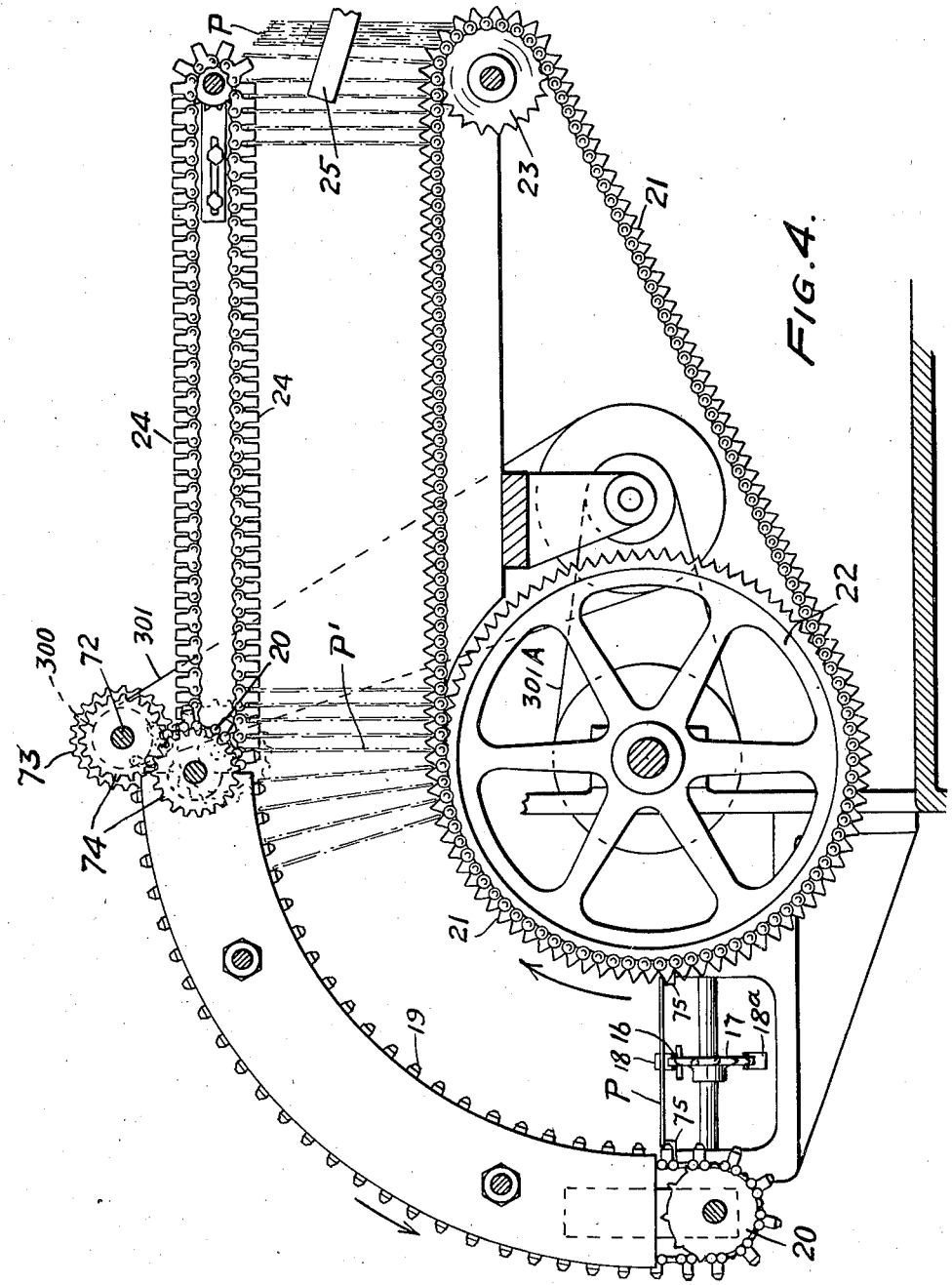

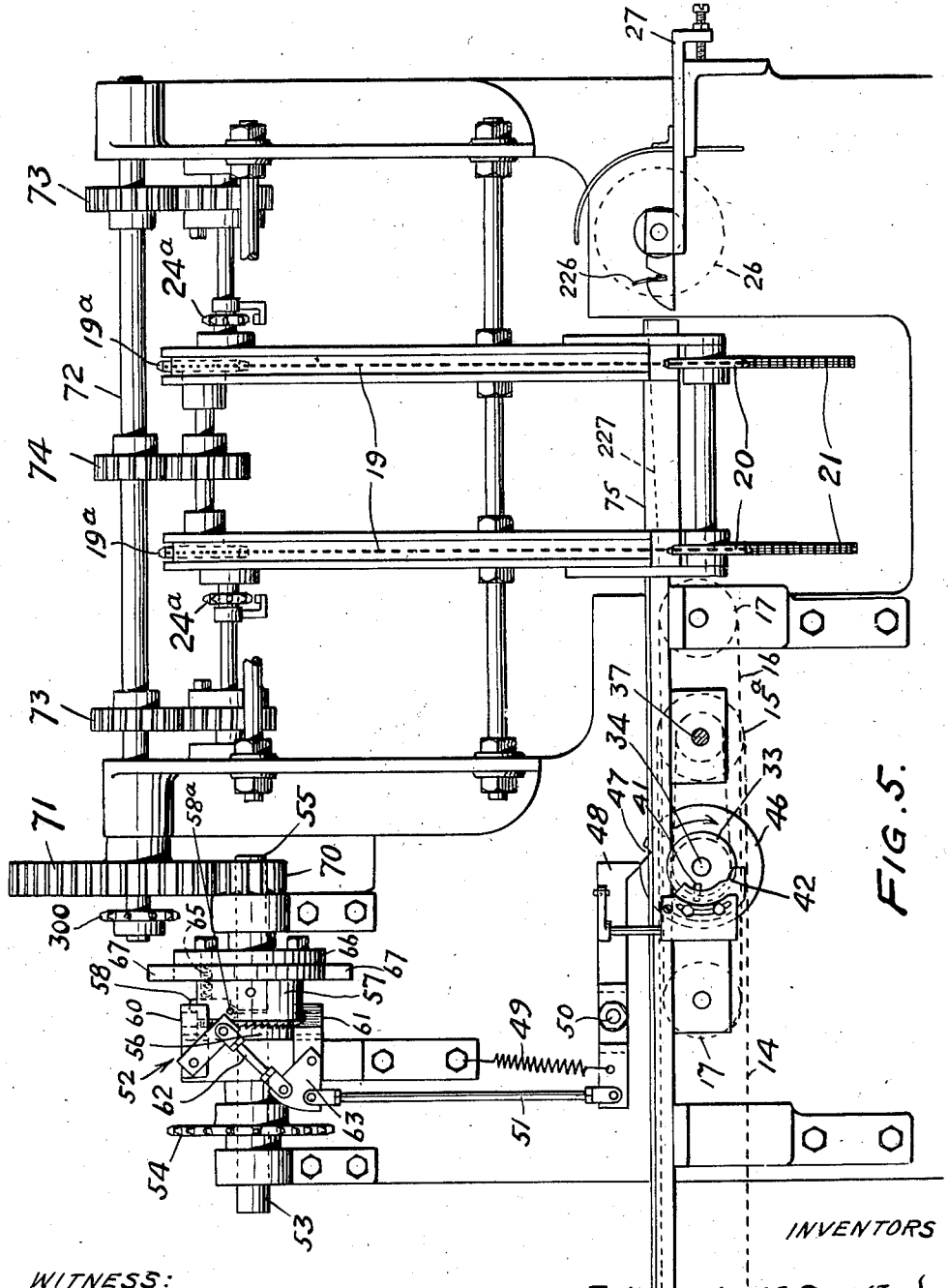

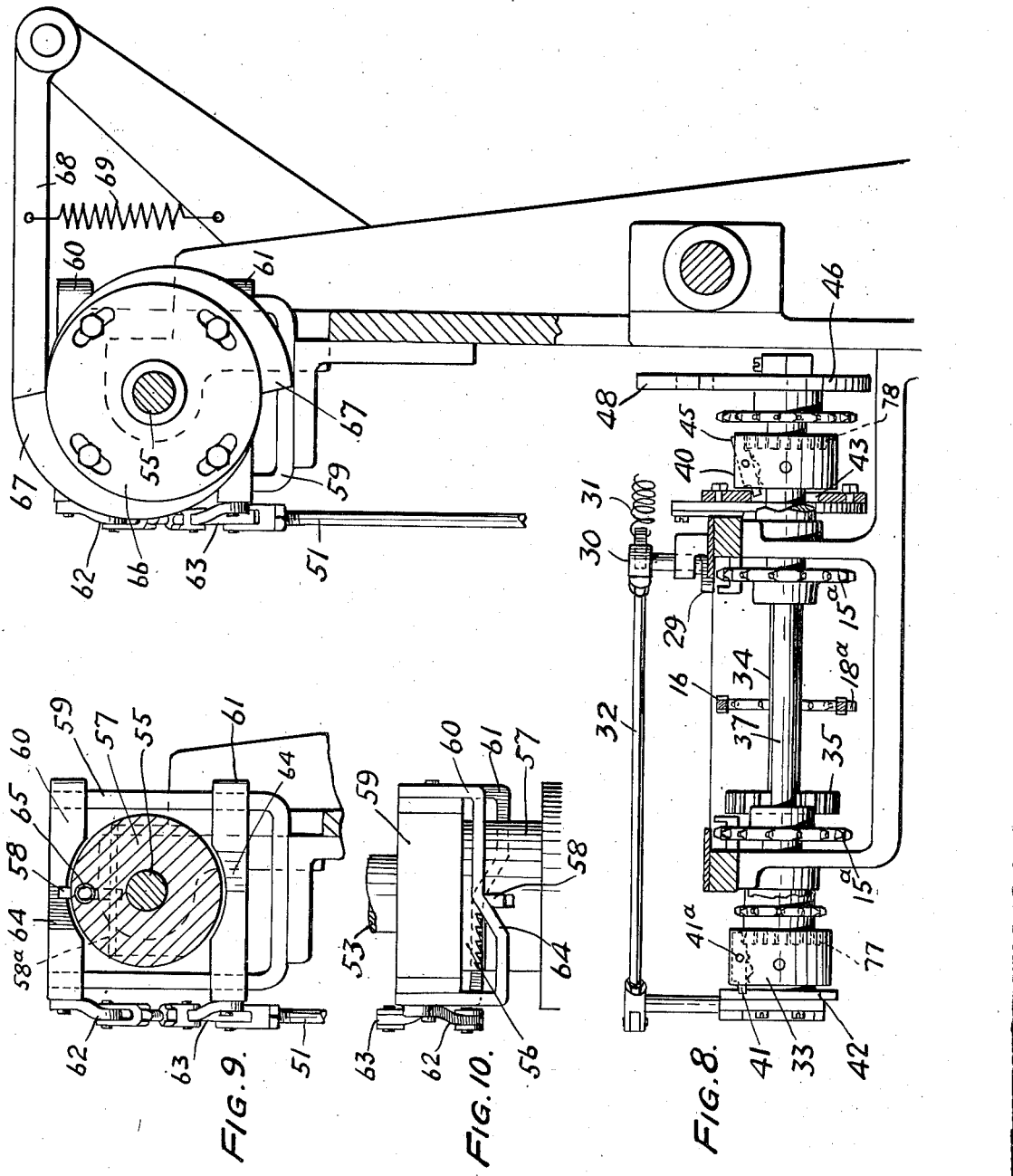

Jan. 5, 1937. E. W. SMITH ET AL 2,066,701
PROCESS FOR SETTING NEWLY PASTED STORAGE BATTERY PLATES
Filed Nov. 3, 1932 8 Sheets-Sheet 7

WITNESS:

INVENTORS
Edward W. Smith
Clarence A. Hall
BY
Augustus B. Stoughton
ATTORNEY.

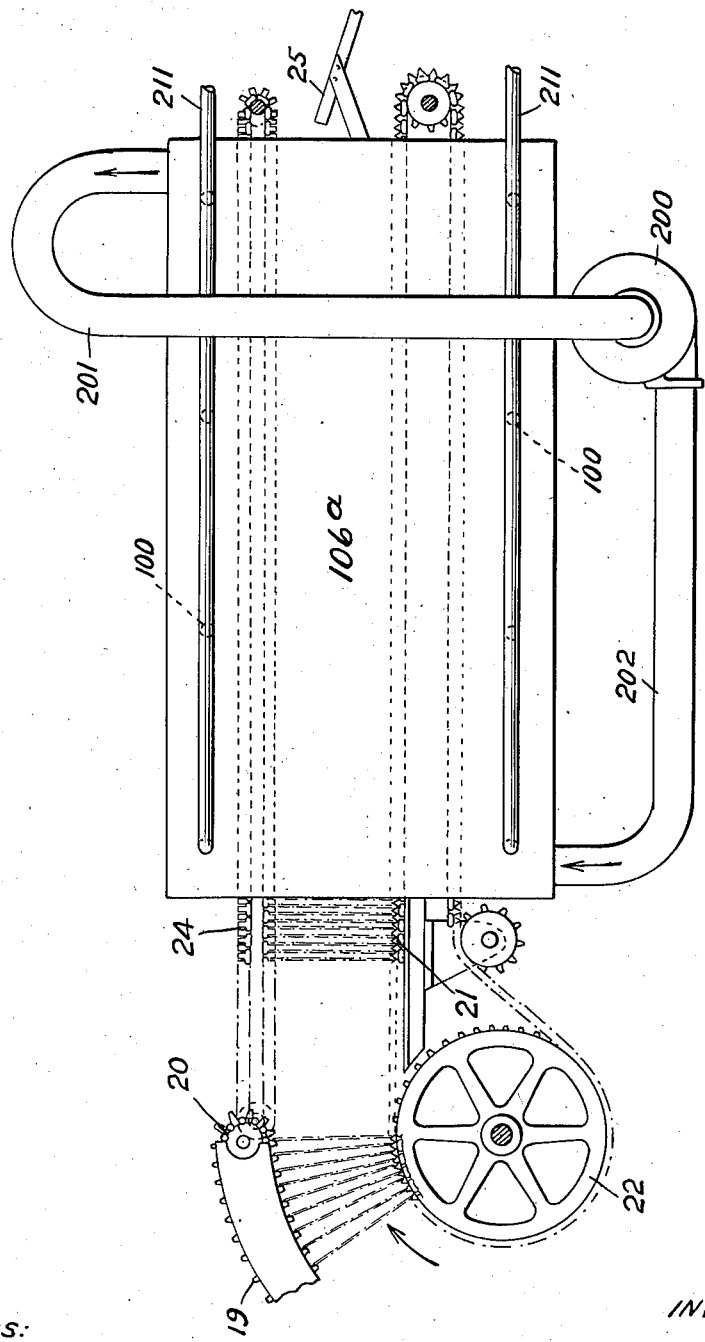

Patented Jan. 5, 1937

2,066,701

UNITED STATES PATENT OFFICE 2,066,701

PROCESS FOR SETTING NEWLY PASTED STORAGE BATTERY PLATES

Edward W. Smith and Clarence A. Hall, Philadelphia, Pa., assignors to The Electric Storage Battery Company, Philadelphia, Pa., a corporation of New Jersey Application November 3, 1932, Serial No. 641,035

3 Claims. (Cl. 136—33)

The principal objects of the present invention are to provide for rapidly, economically and continuously setting the paste of freshly pasted storage battery plates and for partially drying the same in such a way that they can be stacked, or arranged face to face and in contact and kept in the ordinary atmospheric air until it is desired to assemble or form them; and to provide simple, efficient and reliable apparatus for the practice of the method above indicated.

Other objects of the invention will appear from the following description at the end of which the invention will be claimed.

Generally stated the invention comprises heating the plates as they come from a pasting machine in a moist atmosphere which opposes evaporation of moisture from the paste, exposing the heated plates to an unsaturated atmosphere and evaporating a part of the moisture from the paste and setting it, removing any paste from the edge of the grids of the plates that may have been left thereon by the pasting machine, and stacking the plates in contact with each other to retain the residual moisture in the paste until the plates are formed.

The invention also comprises a drying oven adapted to retain a humid atmosphere, heating means for the oven, a moving conveyor continuously carrying newly pasted plates through the oven and through an unsaturated atmosphere, and means for delivering the plates face to face.

The invention also comprises the improvements to be presently described and finally claimed.

The apparatus employed for practicing the invention is a combination of elements capable of various embodiments and we have selected for illustration and description elements of which one is an oven described and claimed in Patent No. 2,035,746 to said Hall and as a modification an oven described and claimed in application, Serial No. 641,037 filed by said Hall and Smith and of which another is means for receiving plates in horizontal position and delivering them face to face in vertical position, such as are described and claimed in Patent No. 2,006,844, granted July 2, 1935, to said Smith. The subject matter of those applications is not claimed herein specifically or otherwise than as it describes elements suited for use in the combination, broadly considered, and in the practice of the method which is a part of the subject matter of this application.

In the following description reference will be made, to the accompanying drawings forming part hereof and in which, Figure 1 is a diagrammatic view in side elevation illustrative of the invention.

Figure 2 is a top or plan view of a portion of the device shown in Figure 1.

Figure 4 is a side elevational view illustrating the plate catcher.

Figure 5 is a front view of the plate catcher looking toward the right in Figure 4.

Figure 6 is a top or plan view of a portion of the plate catcher.

Figure 7 is a sectional view taken on the line 7—7 of Figure 6 with parts omitted.

Figure 8 is a transverse sectional view illustrating parts shown in Figure 6, and on line 8—8.

Figure 9 is a view partly in section of a clutch mechanism hereinafter described.

Figure 10 is a plan view of Figure 9.

Figures 13 and 14 are views similar to Figure 11 illustrating modification.

Figure 11:
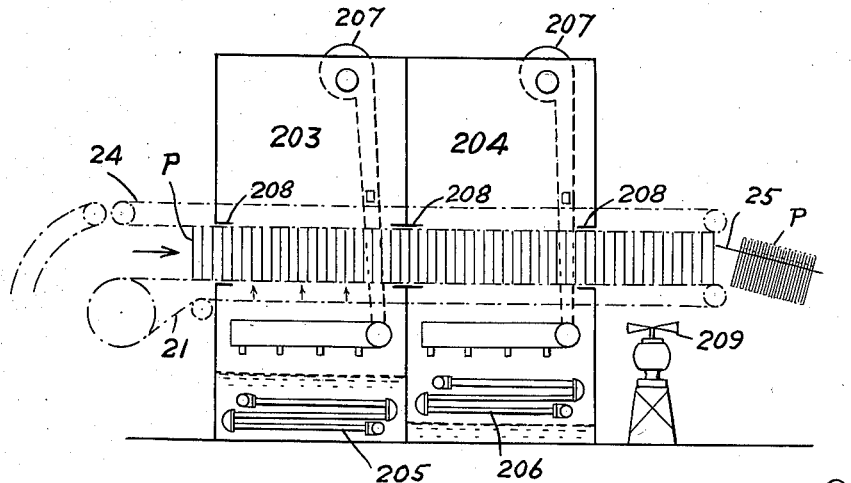
Figure 11 is a diagrammatic sectional elevation illustrating a modification of apparatus suited to the practice of the invention.
Figure 12:
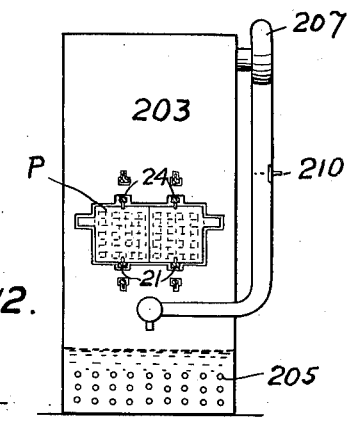
Figure 12 is a transverse sectional view of Figure 11.
Figure 13:
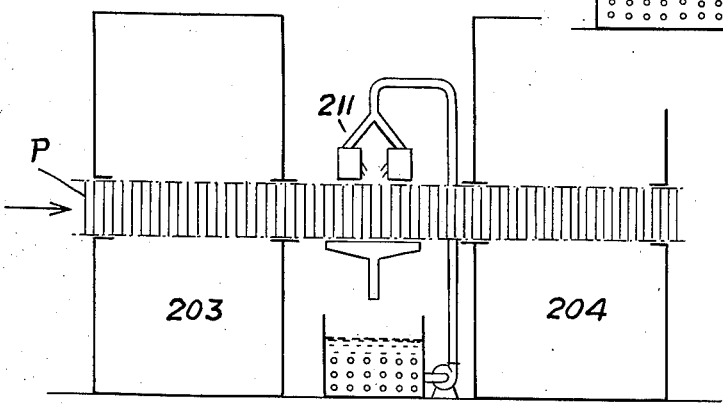

Newly pasted plates from the pasting machine 1 are carried by a conveyor belt 2 and delivered to a conveyor belt 4, traveling around sprocket wheels 5, by which they are carried through an oven 3, Fig. 1, or by belts 21 and 24 through oven 203, Figs. 11, 12 and 13. This oven is heated in a manner that will be described in detail and it is adapted to retain a humid atmosphere. In passing through the oven and through the saturated atmosphere the paste is heated but little or no evaporation takes place. The hot plates are then exposed to an unsaturated atmosphere in which a part of the moisture is evaporated from the plates. Such an atmosphere is provided in Figure 1 by bringing the hot plates out of the oven into the surrounding atmospheric air. In Figs. 12 and 13 this is accomplished by the provision of a chamber 204. The plates at some point in their travel, after leaving the oven in Fig. 1 and before entering the oven in Fig. 11, are placed in side by side relation and ultimately in contact by means of a plate catcher or lifter, diagrammatically illustrated at 13 in Figure 1, which delivers them in that relation. In Figure 1 there is illustrated at 26 a brush which removes any paste that may adhere to the grids of the plates. The plates in contact with each other may be stored conveniently by stacking them one on top of the other so as to retain their residual moisture until it is desired to form them by subjecting them to the well known electrochemical process.

A description will now be given of the oven, Fig. 3. The oven consists of a chamber 6 surrounding the conveyor 4 and a pair of spaced platens or partitions 7 shown as provided with perforations 8. The partitions or platens may be of metal as sheet iron and they are arranged in proximity with the conveyor 4 and with the storage battery plates indicated at P and carried by the conveyor. The upper reach of the conveyor travels upon rails or guides 4ª and is fitted with upstanding pins 4ᵇ which serve as side guides for the plates. 9 are refractory walls which enclose the chamber 6. Heat is supplied to the chamber 6 by gas burners 10 which emit jets of flame. Pipes 11 supply the lower burners and a pipe 111 supplies the upper burners. This pipe 111 is connected to the main gas supply by a flexible connection 112 which permits of the removal of the upper portion of the oven together with the upper partition 7 in order to afford access to the plates P. The oven may be divided into sections, perhaps forty-five inches long in order to facilitate access to the plates. 12 indicates an outlet from the interior of the oven to the exterior atmosphere.

Referring to Fig. 1, the plates are delivered from the pasting machine 1 by the twin conveyor chains 2 through the oven 3 by conveyors 4 onto the twin conveyor chains 14 of the lifting device. The conveyors 2, 4 and 14 are substantially alike and consist of two chains spaced apart so as to support the plates by their edges only. The conveyors 14 operate between sprocket wheels 15 and 15ª, see Figs. 1, 5 and 6, and from 15ª on, the plates are supported on rails 75, see Figs. 4, 5, 6 and 7. The conveyors 14 advance the plates until they are supported on the rails 75 and during the latter portion of its travel each plate engages with the pivoted trigger 29, Fig. 6. Trigger 29 is pivoted at 30 and is acted upon by spring 31. This trigger, acting through rod 32 and levers, actuates a clutch 33 which in turn causes the sprocket chain 16 to move forward, and by means of one or the other lug 18 or 18ª, Fig. 7, to engage with the plate and push it forward onto the rails 75 until it comes to a definite predetermined position with the front edge of the plate engaging with a rotating brush 26, Fig. 6.

Referring now especially to Figs. 4 and 6, a plate marked P is shown in dotted lines resting upon rails 75 and either at or approaching its final position thereon. Each of the rails 75 is provided with two notched openings 76, Fig. 6, and through each of these notches runs a conveyor chain, 19 on the front of the machine, 21 on the back. Sprocket chain 19 travels in an arc concentric with sprocket wheel 22 and sprocket chain 19 passes over a guide and around sprocket wheels 20, the upper one of which acts as driver. These conveyor chains are so spaced that their projecting teeth are separated by a space slightly less than the width of the plate, and the mechanism which operates them, to be described shortly, is such as to bring them periodically to rest while a plate is being slid along the rails 75 in such position that their projecting teeth do not contact with the plate edges. As soon, however, as a plate has come to rest on rails 75 the sprocket chains 19 and 21 are caused to move forward, thus lifting the plate which has just been delivered, by the space of one tooth and coming to rest in position to allow another plate to enter between the next set of sprocket teeth. As successive plates are delivered, therefore, to the rails 75 each one is raised one tooth at a time and with an angular motion which by the time the plate has reached its upper limit, amounts to 90°, thus causing the plate to assume a vertical position, as shown at P', Fig. 4. During this operation of raising the plate, it is to be noted that it is held at four places by the sprocket chains, that is to say, it is held by two points of support along each upper and lower edge, see Fig. 12.

Inasmuch as the plate is being subject to angular motion at the time it is lifted, the outside edge resting on the chain 19 is necessarily moving faster than the inside edge resting on the chain 21, this difference in speed also necessitating the sprocket tooth pitch being greater on the chain 19 than on chain 21. Since it is required to hold the plates in the vertical position from the point P' onward, a third pair of sprocket chains 24, having the same pitch as chains 21 is provided, driven by sprocket wheels 24ª, Fig. 5, which so cooperate with sprocket chain 19 that as the plates leave 19 they are simultaneously picked up by 24. From this point on the plates with their lower edges resting on sprocket chain 21 and upper edges steadied by sprocket chain 24 are carried on in vertical side by side arrangement until they come to the end of the horizontal portion of the chains 24 and 21. Sprocket chains 21 and 24 may be extended to whatever length necessary, being supported, of course, by suitable rails which prevent them from sagging. They may be terminated after relatively short distance, as shown in Fig. 4, or they may be carried along for a number of yards through a drying oven, as shown in Fig. 11. In either case, at the end of these conveyor belts there are placed suitable rails 25, Figs. 4, 11 and 14, on which the plates are deposited still in vertical position and suspended from their lugs.

It is evident that for the successful operation of these various conveyors they must operate in proper unison, and mechanisms by which this is accomplished will now be described in more detail. The conveyor chains 14, Figs. 1, 5 and 6, are continually in motion, so as to receive plates as fast as they come from the pasting machine. The conveyor chain 16, Fig. 7, however, which may be conveniently designated as a booster, is normally at rest with one of its dogs 18 in the position where it has delivered the last one of its plates upon rails 75, and the other dog 18ª out of the way, so as not to interfere with the next plate being delivered over the booster. The booster chain, by means of its sprocket wheel 17 (left hand in Fig. 6) and the train of gear wheels 35 is operated from shaft 34 and the gear ratios are such that one revolution of shaft 34 will exactly correspond to a motion of the dogs between the position 18ª and 18, Fig. 7. Shaft 34 is controlled in its rotation by means of two clutches 33 and 40 which in turn are operated by chains and sprocket wheels 36 and 39, both the latter mounted upon a shaft 37 which latter shaft is kept in continuous motion by means of a motor or other drive and a chain running over sprocket wheel 38. The sprocket ratios are such that clutch 40 is running at a materially lower speed than clutch 33 for reasons which will be presently described. Both of the clutches 33 and 40 are of the self-releasing type, such as are frequently used on punch presses wherein the act of tripping the trigger causes the shaft to make a single revolution and come to rest, until the trigger is again operated. Referring especially to Figs. 5 and 6, the clutch 33 is controlled by means of the trigger 29, rod 32 and latch 42 which engages with the tongue 41 pivoted at 41a, Fig. 8. When the trigger 29 is operated by an oncoming plate, the latch 42 pivoted about a vertical axis is moved out of engagement with tongue 41 allowing the latter to engage in teeth of the continually rotating toothed wheel 77 which thereupon causes clutch 33 to revolve until tongue 41 again engages with latch 42 so as to throw tongue 41 out of engagement with a ratchet tooth on 77. At this point the shaft 34 would come to rest were it not for the second clutch 40 operating at a lower speed than 33. This clutch also is provided with a pivoted tongue 45 and ratchet wheel 78, Fig. 8, and the relative angular position of the release latches 42 and 33 is such that at the time when tongue 41 has been thrown out of engagement, tongue 45 is allowed to remain in engagement with its ratchet teeth until the shaft 34 has turned at the lower speed a number of degrees farther. It is finally allowed to come to rest when the tongue 45 engages with a projecting part of the fixed latch 43 where it remains at rest until trigger 29 is again operated. The effect of these two clutches 33 and 40 is to give the booster chain a rapid motion so as to advance the plate quickly until near its final position, then allow it to slow down and advance slowly to its ultimate position, thus bringing the plate to rest accurately and with a minimum of shock at the time of stoppage when the forward lug of the plate engages with flexible stop 226, Fig. 7.

Mechanism will now be described by which the feed and plate turning mechanism are coordinated. Referring again to Figures 5 and 6, it is to be noted that there is a cam wheel 46 which is fastened directly to shaft 34 and provided with a notch 47. Adjacent to the notch 47 is a second trigger or cam follower 48 pivoted at 50 and spring pressed at 49 and communicating through rod 51, pivotal lever 63 and link 62 to another clutch mechanism designated by 56 and 57. The continually moving member of this clutch is mounted on shaft 53 and is a toothed wheel 56 driven by means of a sprocket wheel 54 connected to a motor or other suitable driver. The intermittent member of the clutch is piece 57 which is connected directly by means of a shaft 55 to pinion 70. The operating tongue or dog of the clutch is pressed by spring 65 and is pivoted at 58a and is designated at 58, see Figs. 9 and 10, and is thrown out of engagement by the twin latches 60 and 61 having projecting parts 64, both of which operate simultaneously from cam lever 48.

As an additional detail or refinement, clutch 57 is provided with a non-chattering mechanism shown especially in Fig. 8. Clutches of this general nature, especially when run at low speed, are subject to chattering when in the released position, due to the fact that the driven member may move just barely far enough to cause the tongue to disengage with the ratchet teeth, but not far enough to clear the ratchet teeth entirely. In the case illustrated, the driven member of the clutch is provided with a double cam 67, Fig. 8, and a lever 68 operated upon by a spring 69 and engaging therewith in such manner that after the tongue has been released from engagement with the ratchet teeth, the lever 68, Fig. 8, acting on the inclined cam faces, moves the clutch member slightly further, and thus throws the tongue in such position that it entirely clears the teeth on driven member 56.

Sprocket pinion 70 engaging with gear 71 communicates motion to the gear wheels 73 and 74 which in turn with their gears operate respectively the two sprocket wheels 24a that run sprocket chain 24, and sprocket wheels 19a which operate the conveyor chains 19. Also through means of sprocket wheel 300 sprocket chains 301 and 301a, Fig. 4, the motion of gear wheel 71 is communicated to sprocket wheels 22 which carry sprocket chains 21. By suitable gear ratios, the driven clutch member 57 communicates to each of the three chains 19, 20 and 24 a forward movement of exactly one tooth each time the trigger 48 is tripped.

In the illustrations it should be noted the various gear ratios are such that a half revolution of shaft 55 corresponds to a forward motion of one pitch of the various sprocket chains 19, 21 and 24. It is for this reason that clutch 56—57 is provided with two release latches, 60 and 61 which cause shaft 55 to make a half revolution each time trigger 58 is operated. The use of this clutch with a 180° motion rather than the usual form, which makes a complete revolution between stops, is merely a matter of convenience in design.

Every time, then, that a plate is delivered to the booster chain 18 and after the booster chain has begun to move forward by an amount which may be adjusted, the cam wheel 46 presents to trigger 48 the notch 47 allowing trigger 48 to drop, which, in turn, releases one or the other latches 60 and 61, causing clutch 57 to make a half revolution, and thus advancing by one tooth all the plates already delivered to the chains 19, 21 and 24, and leaving sprocket teeth ready for the reception of the next plate to be delivered along rails 75.

It may be noted that in order to attain proper speed, the timing of cam wheel 46 is such as to set in motion the various sprocket wheels and chains 19 and 21, etc., before the plate has come to rest against the spring stop 226 and in order to avoid the plate striking against one of the sprocket pins on either chain 19 or 21 during this motion, the rails 75 are inclined slightly upwards, as shown at 227, Figs. 5, 6 and 7.

When the plates are delivered from the pasting machine, the forward edge always carries with it a considerable amount of paste which would be very objectionable in the subsequent handling and final assembling of the plate. The rotating brush 26, Fig. 6, is provided for removing this adhering paste which it does by virtue of the fact that it is kept in continual rotation and at such position, as shown in Figs. 5 and 6, that the front edge of the plate engages with it for a moment as it comes to rest on rails 75. The brush is mounted in adjustable brackets 27 and is shaped so as to correspond with the profile of the lug and front edge of the plate, and it is thus suited to free the whole front edge of the plate from any adhering paste.

When the plates finally reach the end of the sprocket chains 21 and 24, see Figs. 4 and 11, they are released by the chains and deposited with their lugs resting upon suitable rails or bars 25 as shown in cross section on Fig. 12. At this point the space between adjacent plates is naturally closed up and the plates become piled or stacked upon the rails 25 with their surfaces touching each other, whence they may be manually moved in bulk and placed in suitable storage receptacles.

The construction and mode of operation of the modifications shown in Figs. 11, 12 and 13 are as above described, except as follows:

Referring to Fig. 11, the plates P after leaving the pasting machine are turned by the described turning mechanism into side by side relation and are carried by the conveyors 21 and 24, through the oven compartments 203 and 204 which are substantially alike; each is provided with a water tight bottom and with a steam coil, 205 or 206, or other heating means, and with a fan 207 for circulating the atmosphere of the oven through the column of plates. The intermediate and end partitions of the oven compartments are provided with openings for the passage of the plates, such openings fitting the profile of the plates as closely as practicable, and having a short tunnel-like projection 208, so that the opening is substantially closed to oppose intermingling of the atmospheres between one compartment and another and between either of them and the outside atmosphere. Adjacent to the final run of the conveyor chains and in the open air is placed a fan 209 arranged to blow a stream of air directly on the plates. The plates are deposited in face to face relation and in contact on the rails 25. The oven 203 contains water above the steam coil 205, and air from the fan 207, directed downwards and upon the surface of hot water and perhaps upon part of the exposed steam coil becomes heated and humidified and provides an atmosphere in which the plates are highly heated but not appreciably dried. In the oven compartment 204 there is less water so that the coil 206 is exposed to the air circulated by fan 207, so that in this compartment 204 the atmosphere is adapted to absorb moisture from the plates while maintaining them at elevated temperature. The amount of humidity in oven 204 may be easily regulated by raising or lowering the pool of water in the bottom of the compartment, so as to cover more or less of the heating coil 206. Dampers 210 permit of the exit of hot air which is replaced by fresh air entering through the tunnels. Further drying of the plates is effected after leaving compartment 204 as the plates pass in the open over fan 209. The plate surfaces must thus be brought to such a degree of dryness that when placed in contact, face to face, they will not stick together.

Referring to Fig. 13, there is shown a modification wherein the plates in passing from one oven compartment 203 to the other oven compartment 204, are passed through a cascade 211 of a fluid which exercises a strong hardening or setting action upon the lead oxide of the paste of the plates, such as dilute sulphuric acid and/or ammonium sulphate. As an alternative arrangement the cascade may be arranged at the entrance of the oven compartment 203.

In the specification and claims the word "setting" signifies a fixing of the particles of the paste in such a manner that the tendency to crack with subsequent drying is very much reduced or eliminated.

Figure 3:
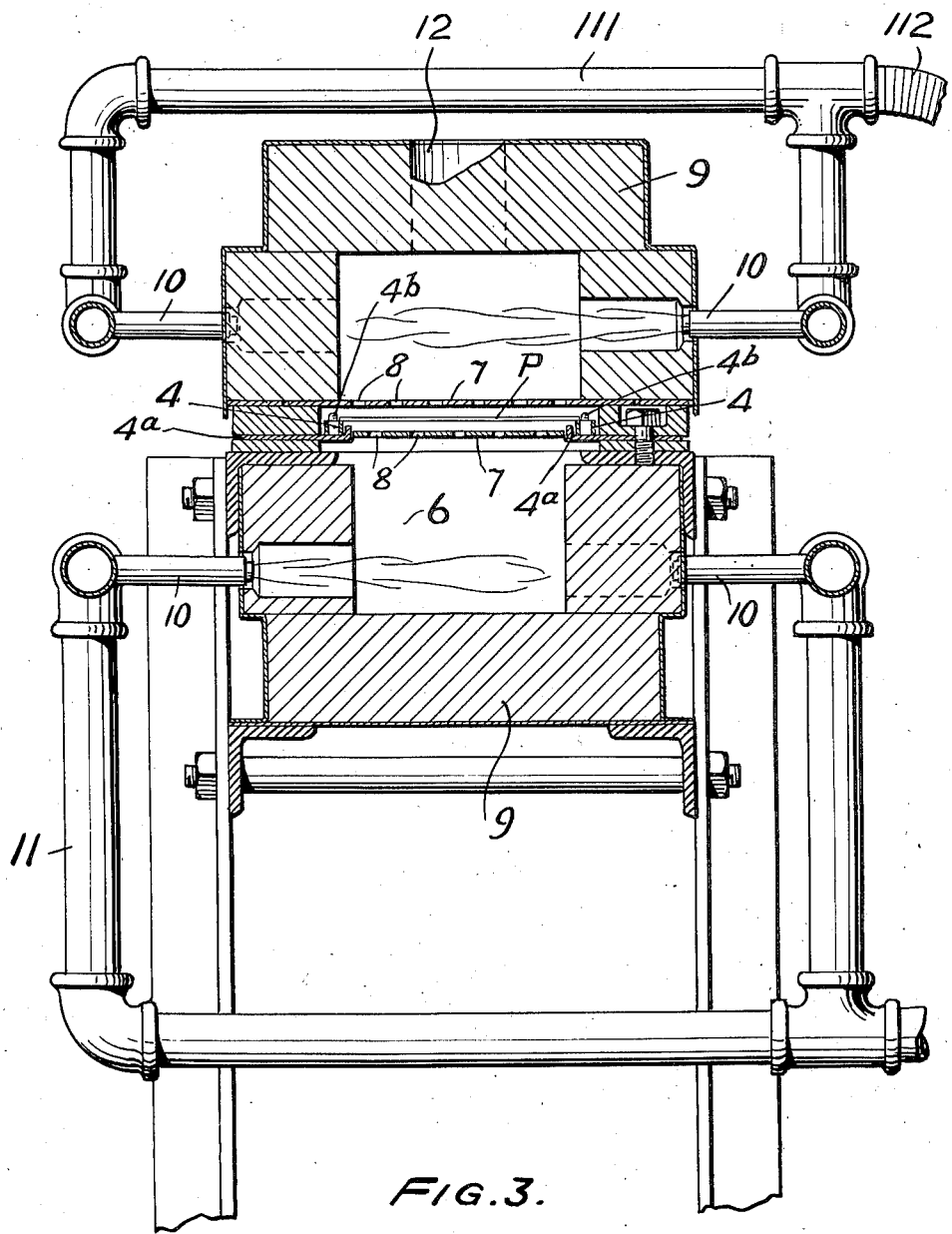
Figure 3 is a transverse sectional view of the oven indicated in Figure 1.

Referring to Fig. 14, the oven 106ª is located beyond the plate lifter or turnover mechanism instead of between it and the pasting machine, and the oven 106ª is substantially as shown in Fig. 3 and as has been described, except that it does not contain a pool of water, and is fitted with a recirculating system including the pipes 201 and 202 and a blower 200, and is fitted with steam jet pipes 211. In this modification the plates are heated in a humid atmosphere in the oven 106ª and are exposed to a dry atmosphere on the rails 25 before they are placed in face to face contact.

It will be obvious to those skilled in the art that modifications may be made in details of procedure and construction and in matters of mere form without departing from the spirit of the invention which is not limited to such matters or otherwise than the prior art and the appended claims may require.

We claim:

1. The herein described process which consists in setting the paste of newly pasted, storage battery plates before substantial evaporation takes place by heating the plates to a relatively high temperature short of the boiling point in a humid atmosphere at atmospheric pressure, evaporating a part of the moisture from the paste by exposing the heated plates to an unsaturated atmosphere at atmospheric pressure, and retaining the residual moisture in the paste by placing the plates face to face in contact with each other.

2. The herein described process which consists in setting the paste of newly pasted, storage battery plates before substantial evaporation takes place by heating the plates to a relatively high temperature short of the boiling point in a humid atmosphere at atmospheric pressure, evaporating a part of the moisture from the paste by exposing the heated plates to an unsaturated atmosphere at atmospheric pressure, lifting and turning the plates into face to face vertical position, and retaining the residual moisture in the paste by placing the plates face to face in contact with each other.

3. The herein described process which consists in setting the paste of newly pasted, storage battery plates before substantial evaporation takes place by heating the plates to a relatively high temperature in a humid atmosphere at atmospheric pressure, evaporating a part of the moisture from the paste by exposing the heated plates to an unsaturated atmosphere at atmospheric pressure, and retaining the residual moisture in the paste by placing the plates face to face in contact with each other.

EDWARD W. SMITH.
CLARENCE A. HALL.